(12) United States Patent
Espinasse

(10) Patent No.: US 6,679,298 B2
(45) Date of Patent: Jan. 20, 2004

(54) COLLAPSIBLE FLEXIBLE PIPE

(75) Inventor: Philippe Espinasse, Bihorel (FR)

(73) Assignee: Coflexip (FR)

( * ) Notice: Subject to any disclaimer, the term of this patent is extended or adjusted under 35 U.S.C. 154(b) by 0 days.

(21) Appl. No.: 10/328,556

(22) Filed: Dec. 23, 2002

(65) Prior Publication Data

US 2003/0116216 A1 Jun. 26, 2003

(30) Foreign Application Priority Data

Dec. 26, 2001 (FR) .............................. 01 16878

(51) Int. Cl.[7] .............................. F16L 9/00; F16L 11/00
(52) U.S. Cl. ...................... 138/172; 138/119; 138/143; 138/134
(58) Field of Search .................. 138/172, 119, 138/134, 135, 118, 143

(56) References Cited

U.S. PATENT DOCUMENTS

| | | | |
|---|---|---|---|
| 3,720,235 A | 3/1973 | Schrock ...................... 138/137 |
| 4,241,763 A | * 12/1980 | Antal et al. ................. 138/127 |
| 5,097,870 A | * 3/1992 | Williams ..................... 138/115 |
| 5,176,180 A | 1/1993 | Williams et al. ............. 138/172 |
| 5,561,453 A | * 10/1996 | Shibata et al. ................ 347/85 |
| 5,730,188 A | * 3/1998 | Kalman et al. ............. 138/135 |
| 5,908,049 A | 6/1999 | Williams et al. ............ 138/125 |
| 6,024,135 A | * 2/2000 | Nobileau .................... 138/134 |
| 6,039,083 A | * 3/2000 | Loper ........................ 138/135 |
| 6,098,667 A | * 8/2000 | Odru ........................ 138/134 |

FOREIGN PATENT DOCUMENTS

| | | |
|---|---|---|
| DE | 19 600 114 | 5/1997 |
| DE | 19600114 | 5/1997 |
| FR | 1417987 | 10/1965 |
| FR | 2658582 | 8/1991 |
| WO | 97/27416 | 7/1997 |
| WO | 02/31394 | 4/2002 |

OTHER PUBLICATIONS

"Specification for Unbonded Flexible Pipe", *American Petroleum Institute*, Exploration and Production Dept., API Specification 17J, First Edition, Dec. 1996, Effective date: Mar. 1, 1997, pp. 1–42.

"Recommended Practice for Flexible Pipe", *American Petroleum Institute*, API Recommended Practice 17B, Second Edition, Jul. 1, 1998, Effective date: Dec. 1, 1998, pp. 1–54 and 61–132.

* cited by examiner

*Primary Examiner*—Patrick Brinson
(74) *Attorney, Agent, or Firm*—Ostrolenk, Faber, Gerb & Soffen, LLP

(57) ABSTRACT

It is of the type comprising at least two reinforcing armour plies (3–6) wound in opposite senses about a longitudinal axis (A—A) and at least one pressure sheath (7), which can collapse in a given direction under the action of external pressure greater than the internal pressure in the said collapsible pipe, the collapse being able to cause a transverse elongation of the said pressure sheath, and it is characterized in that at least one stiffener (8, 9) is provided on at least one surface (7a) of the said pressure sheath, which is made of a thermoplastic, so as, during collapse, to limit the said elongation to a value of less than the elongation threshold of the said thermoplastic.

Application especially to the transporting of hydrocarbons in offshore operations.

15 Claims, 5 Drawing Sheets

COLLAPSIBLE FLEXIBLE PIPE

BACKGROUND OF THE INVENTION

The present invention relates to a collapsible flexible subsea pipe for transporting a fluid.

Collecting a fluid using a flexible pipe means designing a flexible pipe whose structure is such that the integrity of the bore is maintained whatever the operating conditions. The term "bore" means the diameter of the internal element of the pipe, which is the internal carcass in the case of a rough-bore flexible pipe or the internal sealing sheath in the case of a smooth-bore flexible pipe. For flexible pipe structures of these types, reference may be made to API (American Petroleum Institute) 17B and 17J.

The design of a flexible pipe in which the integrity of the bore is maintained means that it must withstand the external pressure or hydrostatic pressure, so as to prevent it collapsing, and the internal pressure, so as to prevent it bursting, and be capable of taking up tensile and compressive loads.

Under normal operating conditions, the internal pressure is greater than the external pressure and there is therefore no risk of collapse. On the other hand, when the internal pressure decreases, for example during production shutdowns of an oil field, the pressure differential between the internal and external pressures may cause the flexible pipe to collapse.

Under such conditions, flexible pipes are designed and dimensioned so as to withstand the maximum pressure differential. As the sea depth increases, the flexible pipe is subjected to an increasingly high hydrostatic pressure, requiring the design of flexible pipes with a very high collapse resistance. On the other hand, under normal operating conditions the pressure differential between the internal pressure and the external pressure ($P_{int}$>$P_{ext}$) decreases, generally to less than 100 bar, thereby simplifying the design of the burst resistant layers. Finally, when the internal pressure decreases, the pipe may be subjected to a very large reverse end cap effect ($P_{ext}$>$P_{int}$), possibly causing the tensile armour plies to buckle. This reversed end cap effect may occur when laying the pipe, if it is laid empty ($P_{int}$=1 bar), or in service during a production shutdown.

The stresses developed in a flexible pipe are taken up by certain structural members of the flexible pipe, depending on whether it is of the rough-bore or smooth-bore type.

In a rough-bore flexible pipe, the external pressure is taken up by the internal carcass, which may possibly be assisted by the pressure vault so as to delay ovalization, whereas in a smooth-bore flexible pipe the external pressure is taken up by the pressure sheath and the pressure vault if an anti-collapse sheath is placed on top of the latter.

The internal pressure or the pressure differential ΔP is taken up by the pressure vault or armour plies, the lay angle of which is about 55° in a flexible pipe. The tensile/compressive stresses are taken up by the armour plies in both types of flexible pipe.

The design of the various structural members of the flexible pipe so as to withstand these stresses has lead inexorably to a considerable increase in the weight of the pipe, which may pose a very substantial problem in deep-water laying. The manufacturing cost is also very greatly increased.

Danish Patent Application 2000/01510 discloses a flexible pipe comprising an internal reinforcement, that takes up the external pressure and compressive forces, a pressure sheath, that provides sealing and secondarily thermal insulation, and an external reinforcement consisting of carbon-fibre armour plies wound helically with a lay angle of 55°, that takes up the internal pressure and tensile forces. The structure of the flexible pipe described in this Danish patent is one which preserves the integrity of the bore. In addition, since the compressive forces are taken up by the internal reinforcement or carcass, this means that the gaps between the turns of the carcass must disappear when it is subjected to compression. The flexible pipe will therefore shorten under the effect of compression, which may cause irreversible damage to the said flexible pipe.

The pipes disclosed in U.S. Pat. Nos. 5,176,180 and 5,908,049 are composite coiled tubings which are locally reinforced in order to increase the performance of the tubing, especially so as to increase the resistance to internal pressure with a low radius of curvature by imposing a direction of curvature, and to limit the stresses due to this curvature. It is not indicated whether the tubing can be collapsed, and then recover its initial shape.

The resistance to hydrostatic pressure in a flexible pipe is developed in API (American Petroleum Institute) 17B, section 5.4.5.1.

Pipes that can be especially wound on a reel or for other applications are disclosed in U.S. Pat. No. 3,720,235, Re 32508 and FR 1 417 987 which relate to flexible pipes that can collapse.

Patent U.S. Pat. No. 3,720,235 discloses a reinforced pipe used in diving equipment. This pipe consists of an internal tube covered with textile reinforcements that withstand collapse and that is covered with an external tube. The internal tube has fluting which allows, in the event of the tube collapsing, a space always to be provided for the fluid to flow. However, it should be noted that collapse is not due to the external pressure but to mechanical forces such as torsional or bending forces. In addition, the materials recommended in that document are "soft" plastics, that is those having a Shore D hardness of between 38 and 55, which have a relatively great capability of undergoing elongation. They may therefore be subjected to repeated considerable deformations without any risk of damage. The plastics known for this kind of application are generally elastomers.

The U.S. Re Pat. No. 32508 relates to a flexible pipe for refuelling ships at sea. The pipe floats and therefore is not subjected to hydrostatic pressure. However, it is stored in a reel in collapsed form and has, along the neutral fibre, longitudinal reinforcements for taking up the tensile forces. The plastic used in that application is of the rubber type (Shore D hardness of less than 38).

Patent FR 1 417 987 actually relates to a flexible pipe for transporting a pressurized fluid and comprises an internal sheath, one or more pressure-resistant reinforcements wound at 55° and an external sheath combined with tension cables. The flexible pipe is collapsible so as to simplify its structure and the storage means. However, collapsing takes place until the facing inner walls of the internal sheath come into contact with each other over their entire surface (joining line). Such a complete collapse does not make it possible to limit the deformation. To achieve this touching collapse, it is indicated in this document that the plastic must have a relatively low Young's modulus, like that of the rubber recommended, that is to say an elastomer. This means that if the plastic used were to be a thermoplastic, the elongations undergone by the internal sheath would cause definitive deformations that would destroy the pressure sheath.

In addition, it should be noted that the material used in the documents discussed above, and to the extent that they relate to a collapsible pipe, is generally an elastomer having a relatively low Young's modulus as in FR 1 417 987. Given the completely collapsed shape of the pipe of FR 1 417 987, the plastic sheaths undergo locally, more particularly at the ends, very large transverse elongations of around 100 to 150%. As elastomers cannot be used in oil applications because they are not resistant to chemical attack by the fluid transported, forming blisters for example, it is preferable to use thermoplastics, whose behaviour as regards the transported fluid is better.

In offshore oil applications, the internal pressure is generally greater than the external pressure. The reverse end cap effect, and therefore the need to withstand collapse, occurs very infrequently during the life of the flexible pipe, around 50 times over 20 years of use in the case of a production line and around 200 to 300 times in the case of a gas line, the reverse end cap effect possibly occurring when laying the pipe and during production shutdowns.

SUMMARY OF THE INVENTION

The object of the present invention is to provide pipe in which the integrity of the bore is not preserved, which is collapsible and the maximum transverse elongation that the pressure sheath of which undergoes during collapse is such that there will be no local damage to the pipe, that is there will be no definitive deformation or rupture of the external fibres, even as a result of cumulative elongations. The term "elongation" is understood to mean transverse elongation and not longitudinal elongation.

The subject of the present invention is a flexible subsea pipe for transporting a fluid, comprising at least two reinforcing armour plies wound in opposite senses about a longitudinal axis and at least one pressure sheath, which can collapse in a given direction under the action of external pressure greater than the internal pressure in the said collapsible pipe, the collapse being able to cause a transverse elongation of the said pressure sheath, characterized in that a stiffener is provided on at least one surface of the said pressure sheath, which is made of a thermoplastic, so as, during collapse, to limit the said elongation to a value of less than the elongation threshold of the said thermoplastic.

One advantage of the present invention lies in the fact that all the structural members necessary for preserving the integrity of the bore are dispensed with and the fact that it thus becomes possible to reduce the weight and the cost of the flexible pipe because collapse resistance no longer needs to be incorporated in the design.

Another advantage of the present invention is that the armour plies are designed to withstand the ΔP (internal pressure—external or hydrostatic pressure) and especially to withstand the radial and axial components of the internal pressure. In addition, such a collapsible flexible pipe has a considerable advantage in the case of applications at great depth and especially against buckling of the armour plies due to the reverse end cap effect.

The reverse end cap effect causes the flexible pipe to collapse, the cross section of which in the collapsed form is smaller than the cross section of the bore in the uncollapsed form. Since the compression induced in the tensile armour plies is proportional to the cross section of the bore, it follows that the tensile armour plies are subjected to little compression as a result of the said pipe collapsing.

When the flexible pipe is of the bonded, or partially bonded, type, the entire structure will collapse under the effect of the external pressure in the event of a drop in internal pressure. The various layers of the flexible pipe will then be designed in terms of fatigue resistance according to the predictable number of collapses.

When the flexible pipe is of the unbonded type and if the reinforcing layers withstand the hydrostatic pressure, only the pressure sheath will collapse under the effect of the internal pressure or the pressure of the annulus, and it will only be necessary to design the pressure sheath in terms of fatigue resistance according to the predictable collapses.

If the reinforcing layers do not withstand the hydrostatic pressure, all the layers will be liable to collapse and therefore it will be necessary to provide means such as an impermeable plastic external sheath capable of maintaining the organization of the structure of the unbonded flexible pipe.

According to another feature of the invention, the stiffener or stiffeners maintaining the geometry of the pressure sheath during collapse cycles allows or allow the maximum elongation of the pressure sheath to be limited to a value of less than 90% of the elongation threshold. This arrangement allows thermoplastics to be used without any risk of degradation. These thermoplastics are preferably what are called semi-hard plastics, the Shore D hardness of which is greater than 55.

According to another feature of the present invention, the pipe includes two stiffeners that are arranged symmetrically in relation to the direction of collapse and that are preferably in the form of rods welded to the internal wall of the pressure sheath.

BRIEF DESCRIPTION OF THE DRAWINGS

Further advantages and features will become more clearly apparent on reading the various embodiments of the invention, together with the appended drawings in which.

DESCRIPTION OF PREFERRED EMBODIMENTS

Figure 1:
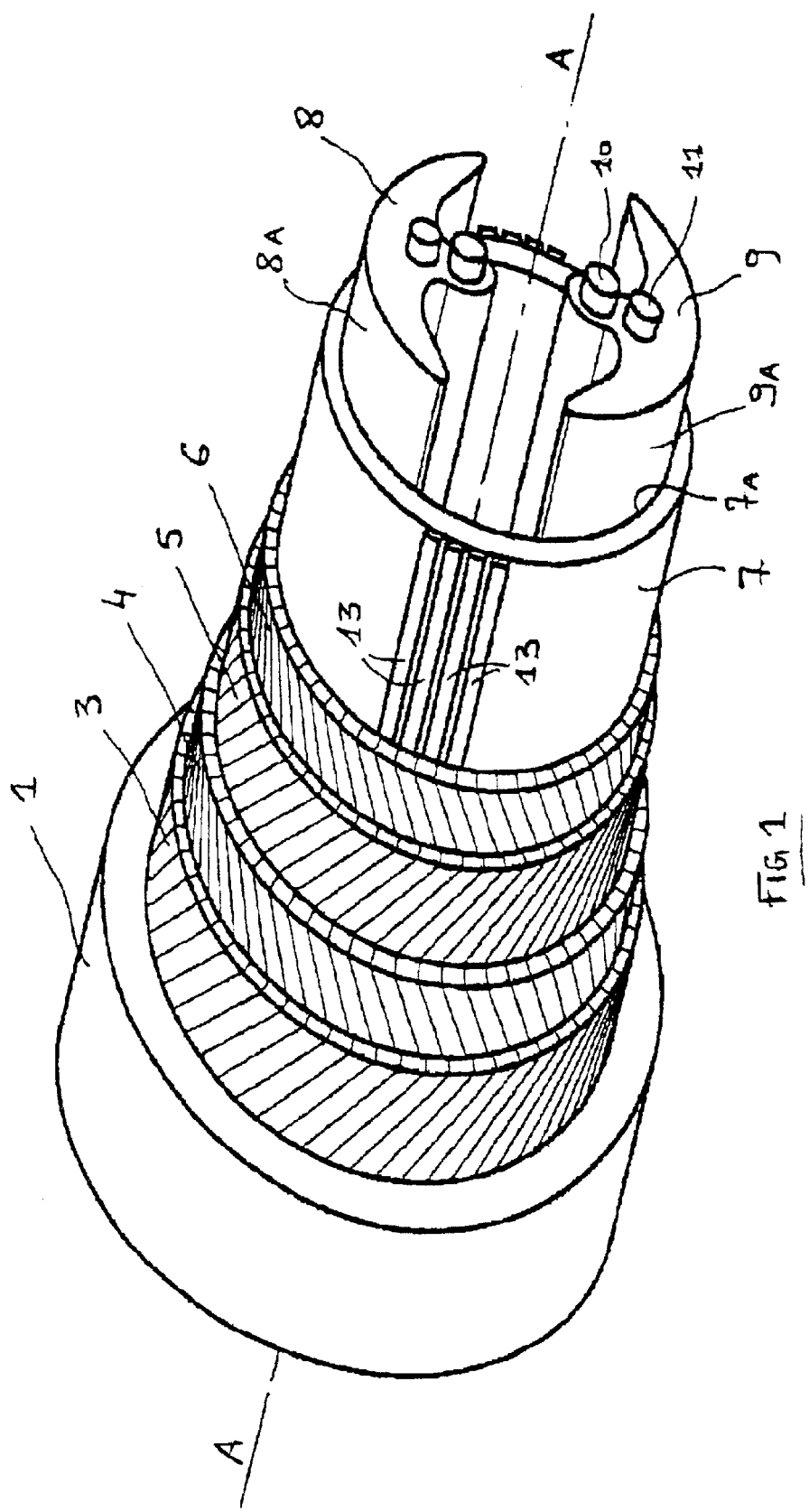
FIG. 1 is a partial perspective view of a flexible pipe according to a first embodiment of the invention.

The flexible pipe shown in FIG. 1 comprises, form the outside inwards, optionally an external polymeric sheath 1, which may be permeable, armour plies 3 to 6 and an internal pressure sheath 7. The armour plies 3 to 6 are wound helically about a longitudinal axis A—A at a balance lay angle of 55°. To do this, the plies 3 and 4 are wound in opposite senses and with complementary lay angles so as to balance the stresses developed in the flexible pipe. The same applies to the armour plies 5 and 6. In another embodiment (not shown), it is possible to use armour plies that are wound with a short pitch at a lay angle of 80° and wound at a lay angle of less than 55° so as to balance the said stresses.

Depending on the structure of the flexible pipe, the first two armour plies 5, 6 may be reinforced in the same direction in order to limit gas diffusion, so that they overlap each other and produce what is called masking; this can also be achieved by one or more armour plies wound with a very short pitch (lay angle of about 80°), which could modify the lay angle indicated above so as to balance the stresses in the structure.

Figure 7:
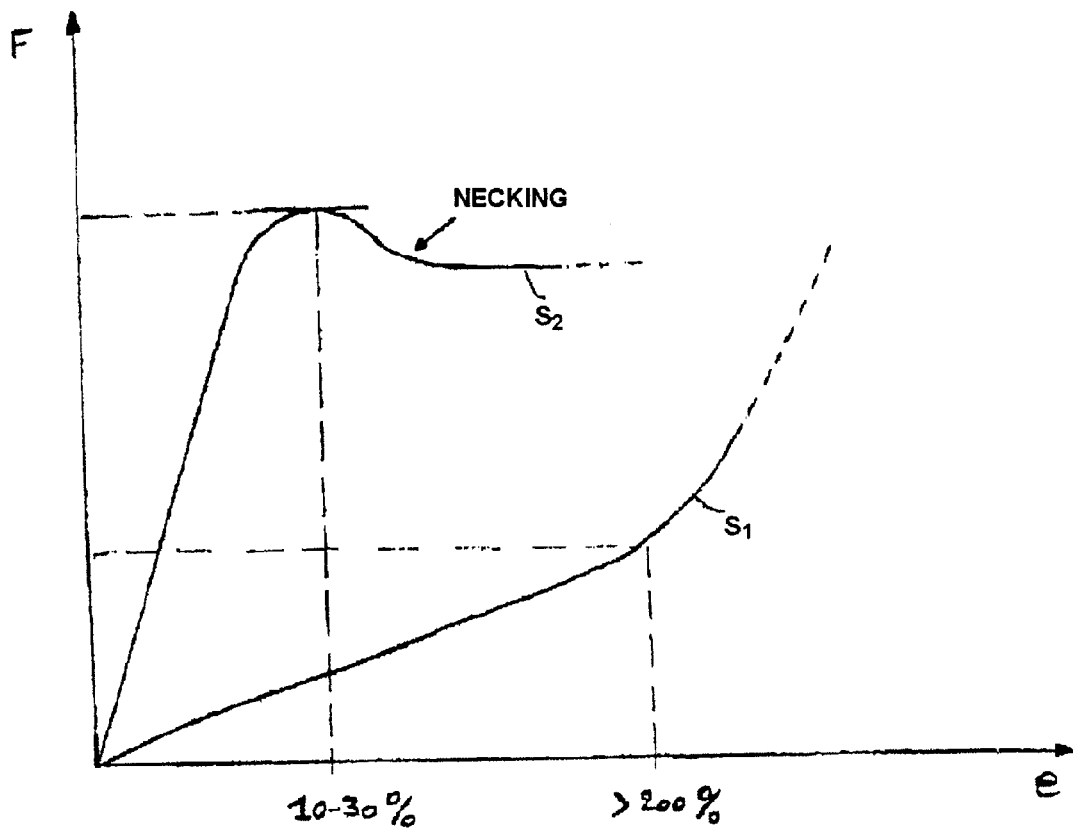
FIG. 7 is a curve showing force F as a function of elongation e for elastomers and thermoplastics.

The choice of thermoplastics for producing the pressure sheath is justified by curves $S_1$ and $S_2$ in FIG. 7, elongation e being plotted on the x-axis and force F on the y-axis. Curve $S_1$ relates to elastomers and curve $S_2$ relates to thermoplastics. It may be readily seen that the elastomer undergoes very substantial transverse elongations, which can exceed 200%, up to rupture and without the appearance of necking, which is a reduction in the cross section. For a thermoplastic (curve $S_2$), the necking phenomenon appears very rapidly above the elongation threshold, which is an elongation of between 10 and 30%, depending on the nature of the thermoplastic. Localized elongations appear around this necking, these being damaging to thermoplastics, which rapidly degrade.

Thus, when choosing the thermoplastic for producing the pressure sheath of the invention, it will be necessary to take measures to ensure that the necking phenomenon is avoided, so as to prevent the formation of cracks and the subsequent destruction of the pressure sheath.

Since the necking phenomenon may also appear when the flexible pipe is subjected to repeated elongation cycles, it has been found that it is essential to take measures to ensure that the transverse elongations that the plastic pressure sheath or sheaths will undergo are less than 90%, and preferably less than 80%, of the elongation threshold of the thermoplastic selected. Thus, it has been found that the maximum elongation must be 15% in the case of polyamide, 10% in the case of a PE and 7% in the case of a PVDF.

According to the invention, the pressure sheath includes at least one stiffener, which is placed on one surface of the said pressure sheath, for example on the outer or inner surface, and which, depending on the nature of the material of which the pressure sheath 7 is made, limits the elongation of the pressure sheath to a maximum of 90% of the elongation threshold of the thermoplastic used, so as to avoid damaging the material by necking or by irreversible permanent deformation during the various collapse/inflation cycles. This is because, during these various cycles, the pressure sheath undergoes elongations that must be controlled so as to avoid, for example, fracture of the external fibres or definitive deformations which would prevent the pressure sheath from resuming its initial shape or which would cause irreversible damage incompatible with long-term use. The materials for the pressure sheath are thermoplastics with a Shore D hardness of, for example, greater than 55 or even greater than 60, like, for example, semi-hard thermoplastics such as a polyamide, for example RILSAN®, a polyethylene or a PVDF. However, it has been found that for the pressure sheath to withstand the repeated collapse/inflation cycles, it is necessary for the maximum transverse elongations of these materials to have values of less than 15% ("RILSAN"), less than 10% (polyethylene) and less than 7% (PVDF), respectively, so that the transverse elongations always remain less than 90% of the elongation threshold.

With regard the pressure sheath, since the elongation depends on the flexural elastic modulus of the material, the diameter, the thickness and the hydrostatic pressure, a person skilled in the art will be able to determine the minimum deformation radius with respect to the diameter of the flexible pipe, and thus the characteristics of the stiffener or stiffeners to be used, these being described later. For a collapsible bonded flexible pipe, the deformation will be more progressive and distributed over the entire diameter of the flexible pipe. The minimum deformation radius can then be determined geometrically with respect to the thickness of the pressure sheath and to the change in radius. In addition, it should be noted that it will be possible for the thickness of the pressure sheath to be smaller because of the fact that it can now be wound in the collapsed state.

Figure 3:
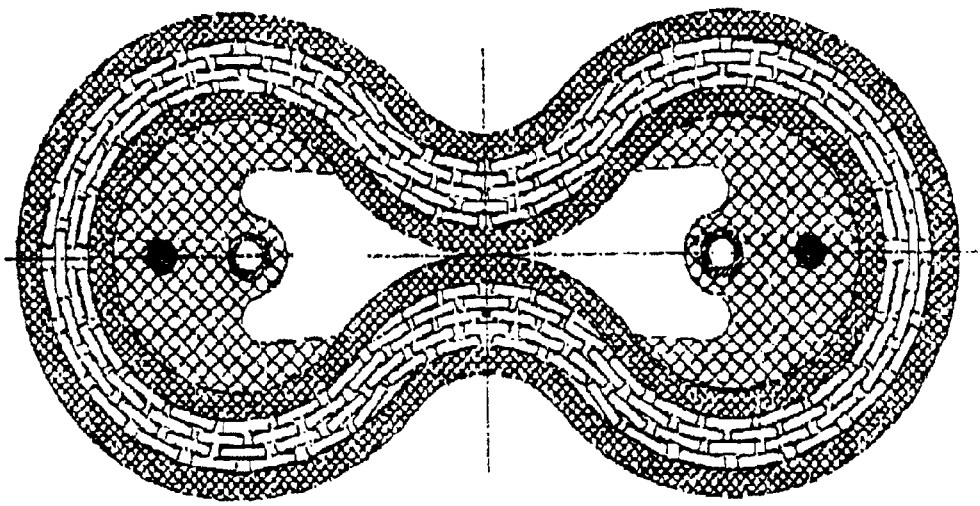
FIG. 3 is a view of FIG. 2, but with the flexible pipe collapsed.

In FIG. 1, two rods 8, 9 are placed on the internal surface 7a of the pressure sheath 7 and preferably symmetrically with respect to the direction of collapse which, in the example shown in FIG. 1, is perpendicular to the longitudinal axis of the flexible pipe. These rods 8, 9 are designed so as locally to increase the stiffness, in order to control the shape of the pressure sheath in the collapsed state, as shown in FIG. 3, or to maintain the geometry.

Longitudinal reinforcing wires 13 may be placed in quadrature with respect to the axis of the rods 8, 9 in order to help in taking up the installation loads, which installation may take place in the collapsed mode using a tensioning member of the double caterpillar track type. Of course, it is possible to insert a thermal insulation into the structure of the flexible pipe. The reinforcing armour plies are preferably made from a thin metal strip so as to make it easier for the entire pipe to collapse. The armour strips may be covered with a thermoplastic in order to ensure bonding between the various layers. The armour plies 3 to 6 and/or the metal bands 13 may be made either from steel strip of small thickness (less than 5 mm and preferably less than 3 mm) and coated with a thermoplastic, or from thermoplastic strips extruded around plies of reinforcing fibres of the carbon, glass or steel type. It is also possible to produce a mixture of types of armour plies in order to optimize the structure. The plastic covering will make it possible to obtain complete or partial consolidation by melting between all the layers of the flexible pipe so as to prevent disorganization when the structure collapses.

In a first embodiment in which the flexible pipe is of the bonded or partially bonded type, that is to say all the layers of the pipe are bonded together or certain members of the structure are locally bonded together, the pressure sheath consists of an extruded thermoplastic tube, having a thin wall and being compatible with the fluid transported. The external surface 8a and 9a of the rods 8 and 9 is welded to the internal surface 7a of the pressure sheath 7 during extrusion of the latter. In this way, the rods 8 and 9 serve to prevent localized elongation prejudicial to the upper metal and plastic layers. Likewise, at least one of the rods 8 or 9 may be placed on the outer surface 2 of the pressure sheath 7, that is to say between the said pressure sheath 7 and the adjacent armour ply 6. However, such a solution would imply good adhesion between sheath and rod.

Figure 2:
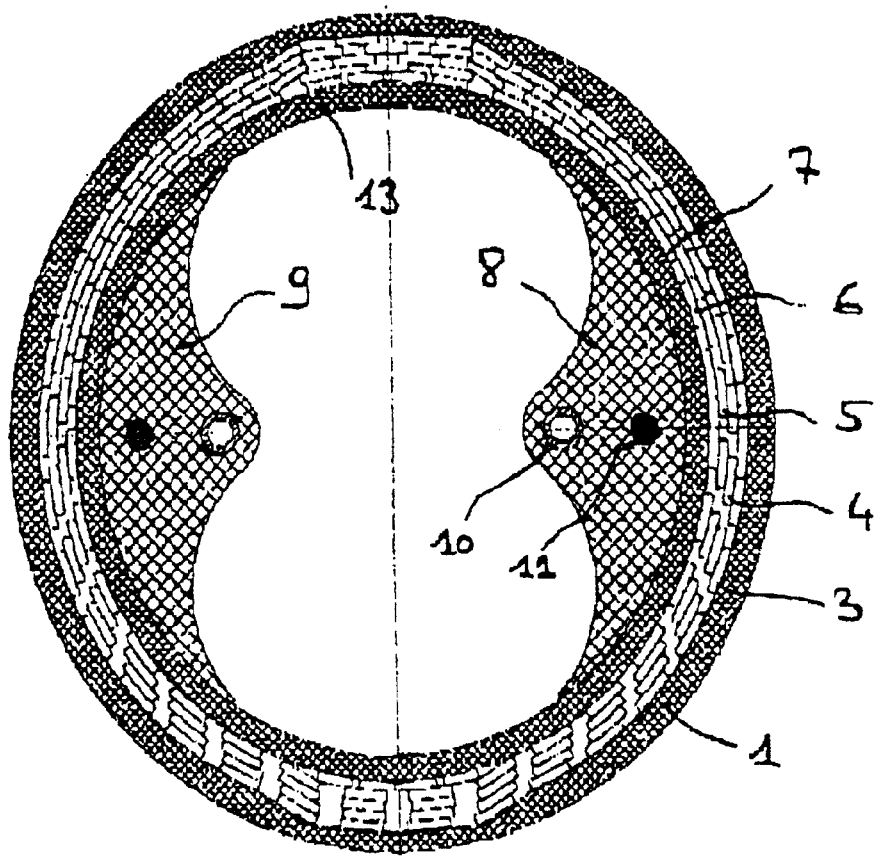
FIG. 2 is a cross-sectional view of the flexible pipe shown in FIG. 1.

The rods 8 and 9 may include, within their thickness or as a core, at least one longitudinal reinforcement of the cable or tubing type, in order to fulfil precise functions such as, for example, the taking-up of the tensile forces. In FIGS. 1 to 3, the member 10 is a tube for transporting a gas, for heating purposes, for injecting inhibiting substances or for control, and it is used also as reinforcement, whereas the member 11 optionally contains one or more optical fibres. The elements 10, 11 are preferably aligned in a direction perpendicular to the direction of collapse, along the neutral fibre.

In the case of a conventional unbonded smooth-bore flexible pipe and if the reinforcing layers withstand the hydrostatic pressure, only the pressure sheath is capable of collapsing under the effect of the external pressure. In this case, the pressure sheath must be designed to withstand the collapses to which it will be subjected during the lifetime of the flexible pipe.

The flexible pipe, whether of the bonded or unbonded type, will be designed in terms of fatigue on the basis of the predictable number of collapses and the various constituent layers will also be designed, in terms of fatigue, on the basis of the fact that they could undergo elastic or plastic deformation.

In the foregoing, it was indicated that the reinforcing rods may be manufactured independently of the pressure sheath and then bonded to the internal or external wall of the said pressure sheath, but is also possible to extrude the pressure sheath with a local bead which would constitute a reinforcing rod.

Figure 4:
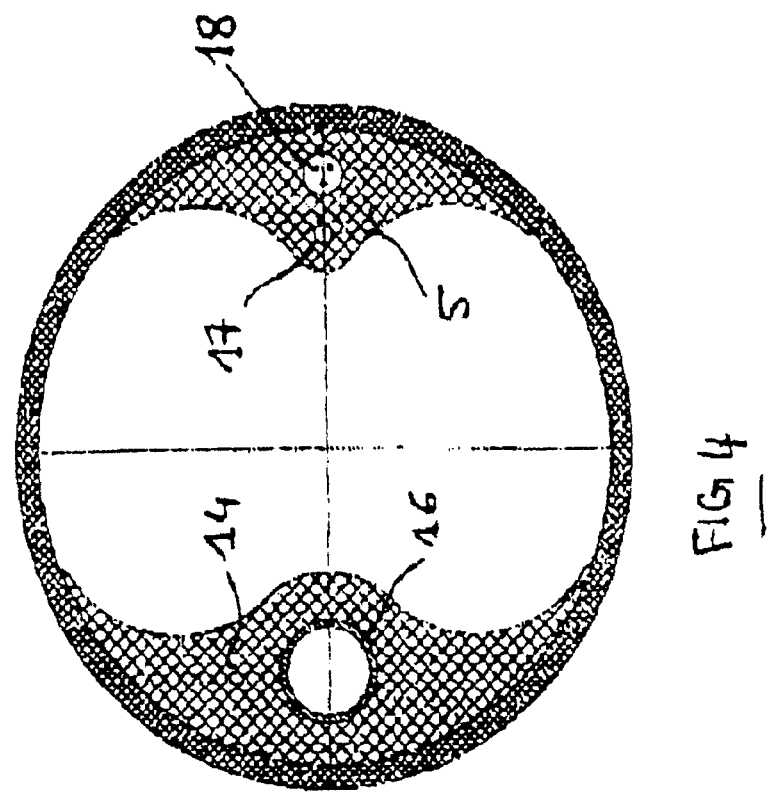
FIG. 4 is a cross-sectional view of the pressure sheath provided with two rods facing each other but differing in size.

The simplified embodiment in FIG. 4 shows a pressure sheath 7 with two internal rods 14 and 15, having different dimensions, the larger rod 14 having a "gas lift" tube 16 and the smaller rod 15 comprising, for example, an optical fibre 17 and another functional element 18.

Figure 5:
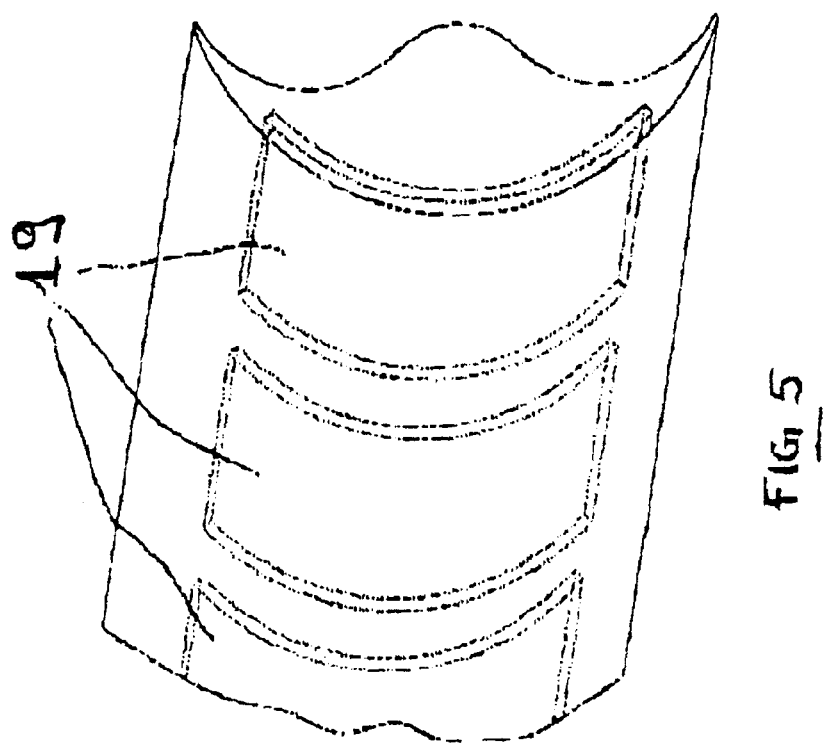
FIG. 5 is a partial perspective view of a stiffening rod provided with reinforcing plates.

It is also possible, as shown in FIG. 5, to further reinforce the rods with metal reinforcing plates 19 which are placed on the inside and within the thickness of the said rods. However, the reinforcing plates 19 could be placed between the internal wall of the pressure sheath and the corresponding rod. The metal plates reinforcing the stiffeners allow the stiffness of the pressure sheath/stiffeners structure to be increased if this were to prove necessary. In the foregoing, reference was made to metal reinforcing plates, but it goes without saying that other materials could be envisioned, such as composites or assembled systems. It is thus possible to use a system comprising small plates in strings in order to increase the local stiffness, instead of the rods.

Figure 6A:
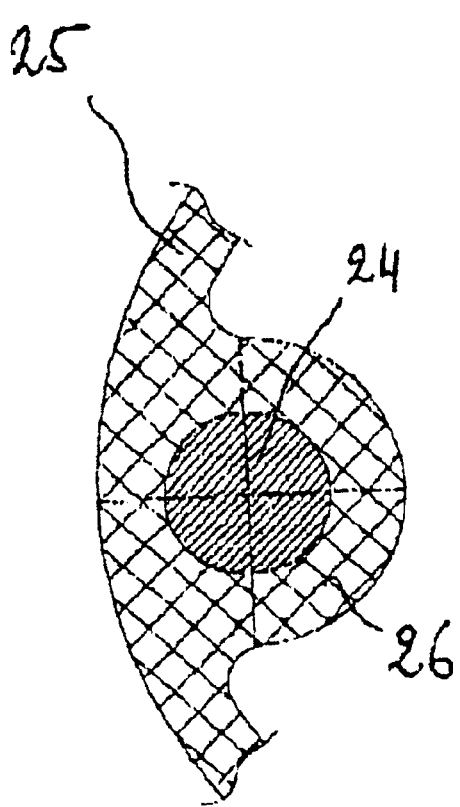
FIGS. 6a and 6b are partial schematic representations of other embodiments of stiffening rods.
Figure 6B:
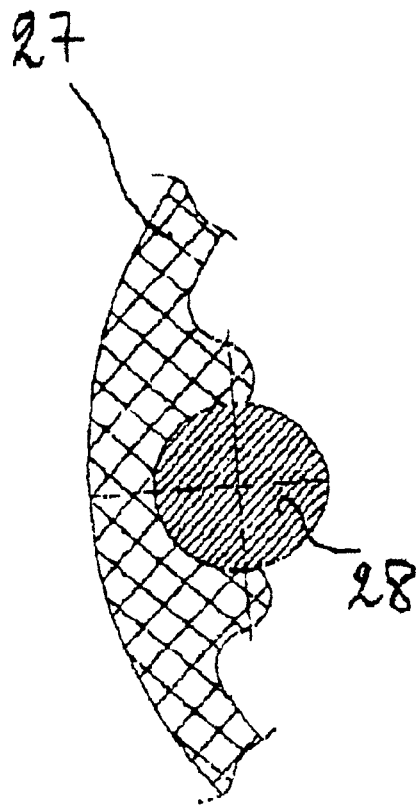

FIGS. 6a and 6b show other designs of the pressure sheath which may include (FIG. 6a) a cable 24 within the thickness, the pressure sheath 25 being extruded around the cable 24 and comprising a bead 26 constituting a reinforcing rod, or (FIG. 6b) a pressure sheath 27 extruded around a cable 28 which is partly housed in a bead 29.

In all cases, the shape, position and number of reinforcing rods are determined according to the desired collapsed shape of the pressure sheath, it being mentioned that the desired aim is to have an elongation of less than the maximum elongation threshold of the thermoplastic used in the external fibres of the pressure sheath. In addition, the reinforcing rods, depending on the members that they comprise and consisting of tensile cables, tubes, electrical or optical fibres, may have different shapes and/or different sizes, as was described with regard to FIGS. 4 to 6b.

It goes without saying that, depending on the shape and the position of the rods, on the outside or on the inside of the pressure sheath, the collapsed shape may assume whatever profile, a figure 8, a U, a kidney bean, etc., if the maximum elongation of 90% of the elongation threshold of the thermoplastic used is respected.

What is claimed is:

1. Flexible subsea pipe for transporting a fluid, comprising
   at least two reinforcing armour plies wound in opposite senses about a longitudinal axis;
   at least one pressure sheath inside the armour plies, wherein the pressure sheath is made of a thermoplastic, has internal and external surfaces, and can collapse in a given direction under the action of external pressure greater than the internal pressure in the pipe, and wherein the collapse is able to cause transverse elongation of the pressure sheath; and
   at least one stiffener on at least one of the surfaces of the pressure sheath, so that during collapse of the sheath, to limit the elongation of the sheath to a value of less than the elongation threshold of the thermoplastic thereof.

2. Flexible pipe according to claim 1, wherein the structure of the flexible pipe is of the at least partially bonded type.

3. Flexible piper according to claim 1, wherein the structure of the flexible pipe is of the unbonded type.

4. Flexible pipe according to claim 1, wherein the stiffener is placed on the internal surface of the pressure sheath.

5. Flexible pipe according to claim 1, wherein the stiffener is placed on the external surface of the pressure sheath.

6. Flexible pipe according to claim 1, further comprising two of the stiffeners placed opposite each other inside the pressure sheath.

7. Flexible pipe according to claim 6, wherein the two stiffeners are symmetrical with respect to the direction of collapse.

8. Flexible pipe according to claim 1, wherein the elongation of the pressure sheath is less than 90% of the elongation threshold of the thermaoplastic thereof.

9. Flexible pipe according to claim 1, wherein the stiffeners comprise rods inserted into the pressure sheath.

10. Flexible pipe according to claim 4, wherein each stiffener has an external surface and the stiffener is welded by the external surface thereof to the internal surface of the pressure sheath.

11. Flexible pipe according to claim 1, wherein at least one of the stiffeners includes, in its thickness, a longitudinal reinforcement.

12. Flexible pipe according to claim 1, wherein each reinforcing armour ply is wound with a winding angle of about 55° with respect to the longitudinal axis of the said pipe.

13. Flexible pipe according to claim 1, further comprising rigid plates embedded in the thickness of one of the stiffeners and uniformly distributed over the entire length of the stiffeners.

14. Flexible pipe according to claim 1, wherein the stiffener comprises a bead of material of the pressure sheath.

15. Flexible pipe according to claim 14, further comprising a reinforcing member embedded in the bead of the material.

* * * * *